June 11, 1935.  O. F. HOMEIER  2,004,517

TOOL FOR PREPARING LAMINATED FABRICS FOR SPLICING

Filed Sept. 28, 1932

Inventor,
Otto F. Homeier
By Eakin & Avery
Attys.

Patented June 11, 1935

2,004,517

UNITED STATES PATENT OFFICE 2,004,517

TOOL FOR PREPARING LAMINATED FABRICS FOR SPLICING

Otto F. Homeier, Akron, Ohio, assignor to The B. F. Goodrich Company, New York, N. Y., a corporation of New York Application September 28, 1932, Serial No. 635,150

1 Claim. (Cl. 164—83)

This invention relates to a tool for use in preparing laminated fabrics for splicing and is especially useful in preparing transmission belts or other articles comprising laminated fabrics where it is desired to step the article for splicing.

The principal objects of the invention are to provide a device which will be simple and inexpensive to manufacture, and will be accurate and efficient in use, and to provide a device which may be used for cutting a ply from the laminated article without injuring the adjoining plies.

Other objects will appear from the following description and the accompanying drawing.

Figure 1:
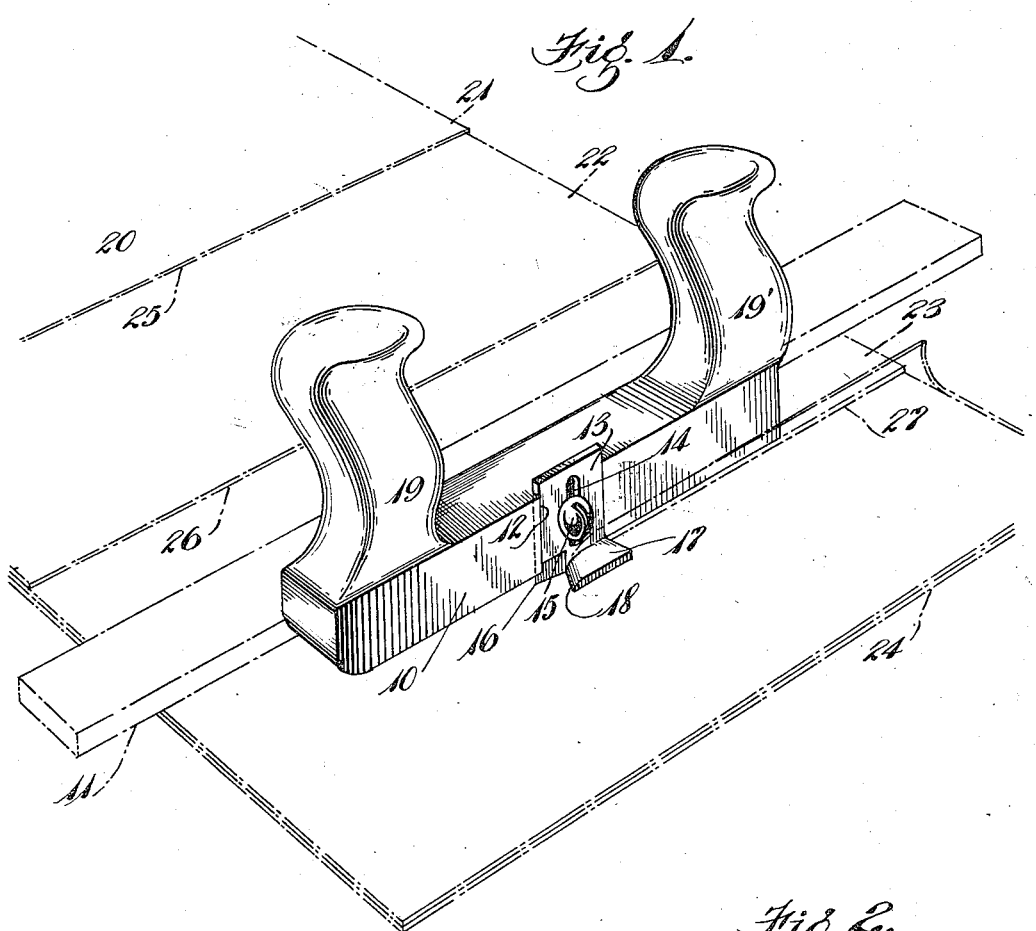
Fig. 1 is a perspective view of the device in use, the laminated article being operated upon being shown in dot and dash lines.
Figure 3:
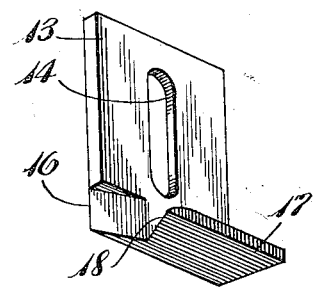
Fig. 3 is a perspective view of the cutter.
Figure 2:
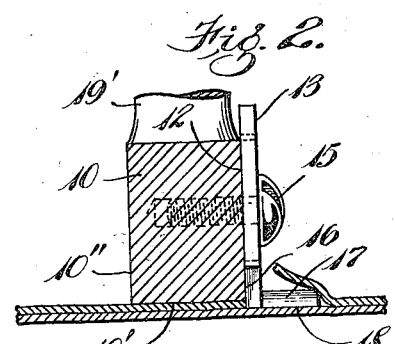
Fig. 2 is a cross-sectional elevation of the tool and a laminated sheet of material taken at the leading edge of the cutter.

Referring to the drawing, the numeral 10 designates the body of the tool which is provided with a bed surface 10' shaped to conform to the surface of the article to be operated upon, and a guide surface 10'' adapted to follow a guide 11. The body 10 is also formed with a channel 12 preferably vertical to the surface 10' for receiving a cutter 13. The cutter is provided with a slot 14 for receiving a clamp screw 15 which is threaded to fit a threaded opening in the body of the tool.

The cutter 13 is provided with a cutting edge 16 on its leading vertical margin and has a wing 17 extending laterally away from the body of the tool and provided with a dull edge 18 for separating the plies said edge preferably being inclined laterally to the line of travel.

One or more handles 19, 19', may be provided to assist in gripping the tool.

The device is shown as operating upon a laminated fabric structure such as a transmission belt 20 comprising plies 21, 22, 23, and 24 of fabric united by an adhesive material such as rubber, it being desired to step the plies as at 25, 26 and 27 to splice the belt.

The operation of the device is as follows: Having determined the line of a desired step, the guide 11 is clamped to the laminated article a distance from the line of cut equal to the width of the body of the tool from the guide face 10'' to the cutting edge 16. The cutter 13 is set to project below the body 10 by a distance equal to the depth of one ply of fabric. The tool is then placed on the laminated fabric against the guide and is propelled therealong by hand. The edge 16 of the cutter slits the top ply without injury to the underlying plies and the dull edge 18 lifts a zone of the top ply adjacent the line of cut so as to permit grasping the top ply and separating it from the laminated material.

I claim:

A tool for cutting and separating a face ply from an article formed of laminated sheet material, said tool comprising a body adapted to be propelled across the face of the article along a guide and having a lateral face of such substantial area as to follow said guide without substantial effort of the operator and an extensive bottom face of such extent as to provide stability of support from the face of the article, a pair of handles projecting from said body near the respective ends thereof, and a vertically disposed cutter adjustably attached to the body at a position between said handles and adapted to split a ply therefrom and to lift the ply at one side only of the cut, said cutter being formed with an integral plough extending laterally therefrom on one side only of the cutter and having a flat lower face and bevelled on the upper side to provide a dull ply separating edge at said lower face, said cutter having a vertical slitting edge extending as far from the body as the lower face of the plough and located in advance of the ply separating edge thereof so as to slit the ply in advance of the plough, said plough extending away from the cutter in such a direction as not to be covered by the body and to permit lifting of the ply on one side of the cut.

OTTO F. HOMEIER.